May 1, 1956      S. LOEB, JR      2,743,580

IGNITER FOR ROCKET MOTORS

Filed Oct. 7, 1952      2 Sheets-Sheet 1

INVENTOR.
SIDNEY LOEB, JR.,
BY Nicholas T Vohr
his ATTORNEY.

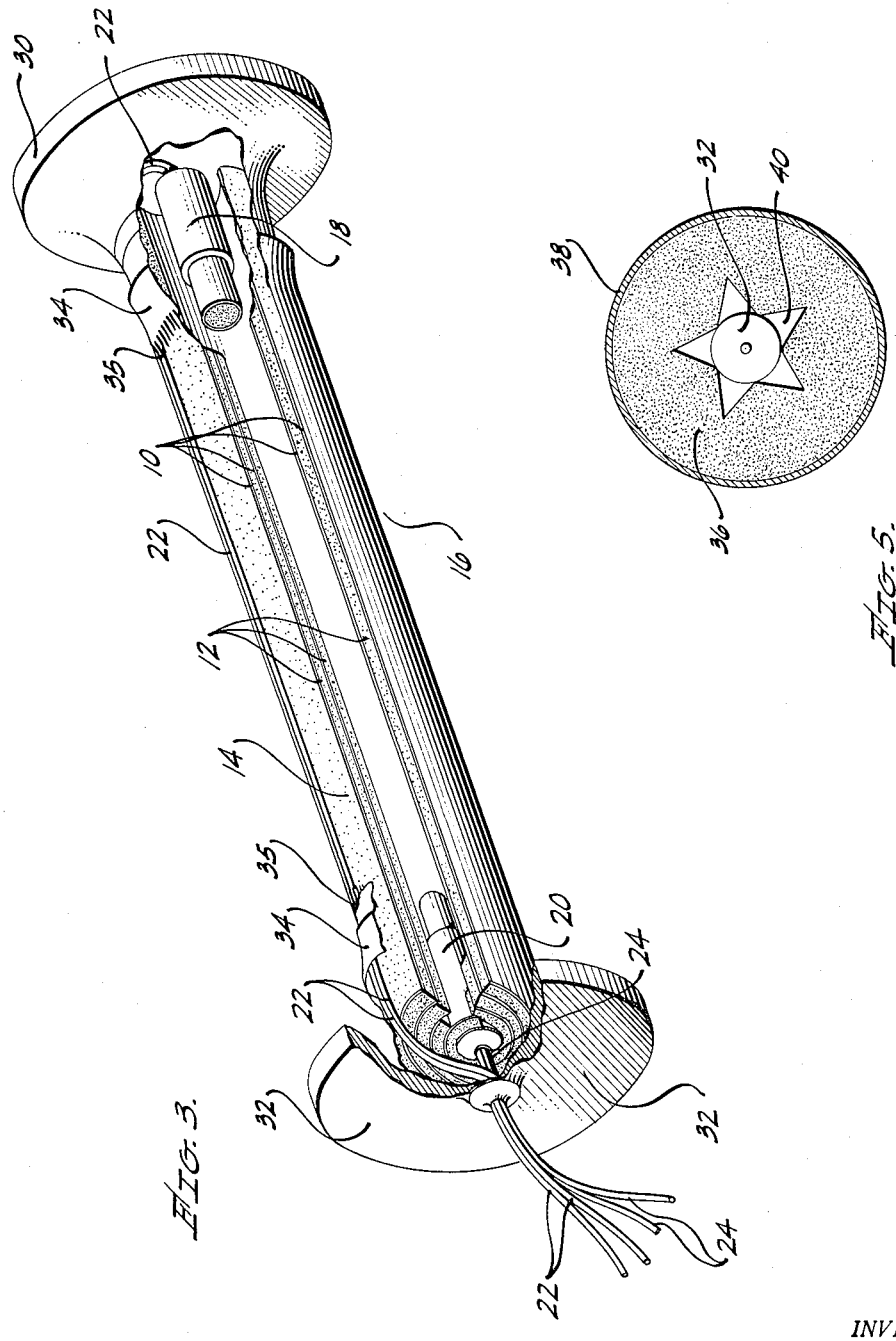

United States Patent Office 2,743,580
Patented May 1, 1956

2,743,580

IGNITER FOR ROCKET MOTORS

Sidney Loeb, Jr., Los Angeles, Calif., assignor, by mesne assignments, to Hughes Aircraft Company, a corporation of Delaware Application October 7, 1952, Serial No. 313,493

7 Claims. (Cl. 60—39.82)

This invention relates to igniters, and more particularly to an igniter construction suitable, for example, for igniting fuels such as rocket motor propellants and the like.

Igniters as generally employed in rocket motors, for example, are inserted within the fuel, or propellant, of such motors to be lighted, or burned for the purpose of initiating combustion of the propellant. In order that such igniters be effective upon burning to cause combustion of propellants that are relatively difficult to ignite, such as solid propellants of the polysulfide type, it is necessary that the burning igniter be retained within the propellant until the propellant is ignited. Otherwise, accumulating gases generated by the burning igniter will force the igniter from the rocket motor before such propellant is ignited. Such self-ejection of igniters has been prevented in the past by the provision of a releasable closure element, such as a steel disk of suitable size, inserted in the nozzle of a rocket motor. These nozzle closure elements withstand gas pressures resulting from the burning igniters until sufficient heat is generated within the propellant to effect combustion thereof. Once a propellant has been ignited, both the nozzle closure and the igniter parts are ejected.

When nozzle closures are used in the manner aforementioned, there always exists the possibility that the nozzle closure element may remain in its position within the nozzle until the gas pressure which has been built causes serious damage to the rocket motor itself or to the housing within which the rocket motor is enclosed. Furthermore, the closure element is ejected from the rocket motor at great speed and constitutes a missile-like object which may damage any structure that is located to the rear of the rocket motor.

The present invention provides an igniter arrangement or construction for rocket motor propellants and the like that eliminates many of the disadvantages of prior art igniters. In accordance with the disclosed invention, an igniter suitable for igniting a solid propellant used in a rocket motor, and which eliminates any need for a nozzle closure, comprises a tightly wound igniter roll of a sheet of plastic foundation or backing material that has been coated on one side with a mixture of bonded combustible materials. Squibs inserted in the igniter roll are adapted to be flashed electrically for igniting the combustible material of the igniter roll. By virtue of the compactness of this arrangement, and the suspension of the combustible materials in a binder, the igniter roll generates a relatively great amount of thermal energy substantially instantaneously upon the squibs being flashed. Such an igniter roll may be adapted for insertion in a rocket motor and may be in releasable engagement therewith or releasably disposed therein. The combustible materials, upon flashing of the squibs, instantaneously generate considerably more heat than is required for ignition of the propellant for the rocket motor, and the propellant will be ignited before the igniter is ejected from the motor.

It is, therefore, an object of this invention to provide an igniter which will achieve substantially instantaneous ignition of a fuel.

It is another object of this invention to provide a reliable igniter for rocket motor solid propellants, which is capable of being handled or stored without deterioration.

It is a further object of this invention to provide a highly effective igniter construction which is capable of being manufactured in quantities with uniform characteristics and performance.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention. In the drawings, Fig. 1 is a perspective view of a portion of a fuel igniter in accordance with this invention;

Fig. 3 is a perspective view, partly in section, of a preferred construction of a fuel igniter including the portion shown in Fig. 2;

Fig. 5 is a sectional view taken along line 5—5 of Fig. 4.

Figure 1:
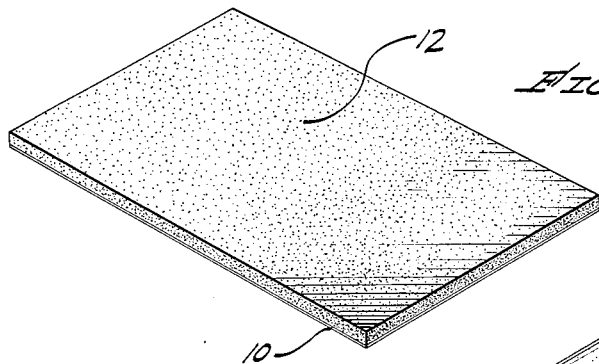

Referring to the drawings, in which like reference characters indicate like parts throughout, and more particularly to Fig. 1, a sheet of moisture-resistant backing or foundation material 10, which, for example, may be a thin film of cellulose acetate, is provided on one surface with a coating 12 of a bonded combustible mixture. Any suitable combustible mixture may be employed which is capable of generating high thermal energy, and may, for example, be a mixture of magnesium powder and an oxidizer such as potassium perchlorate. The combustible material employed preferably is suspended in a suitable inert binder to provide a homogenous mixture for coating the backing material 10. For example, the mixture of magnesium powder and potassium perchlorate above mentioned may be suspended in a polyisobutylene binder.

Figure 2:
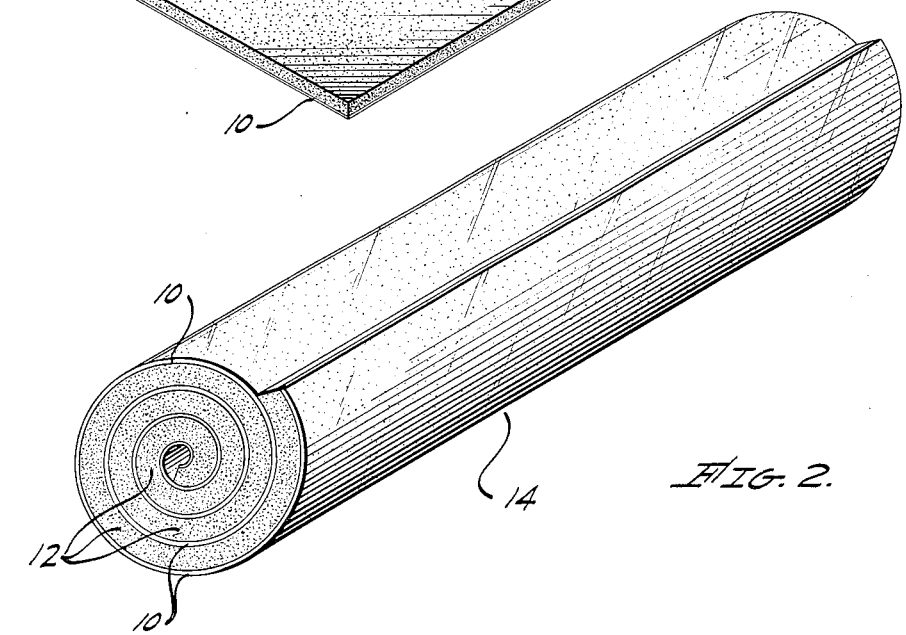
Fig. 2 is a perspective view of a preferred configuration of the fuel igniter portion shown in Fig. 1.

The coated sheet of backing material 10 preferably is rolled tightly, in "jelly-roll" fashion, to provide a compact igniter roll or element 14 as illustrated in Fig. 2. The binder prevents settling of the powders employed in the combustible mixture, and consequently is effective to insure uniform burning of the combustible material when it is ignited. As will be pointed out hereafter, the compactness of the igniter roll above described is effective to create intense heat almost at the instant it is ignited. The inert binder also is effective to prevent deterioration of the combustible materials; furthermore, the binder, by keeping individual particles of combustible material substantially separated, insures that the ignited roll can be handled with safety.

Since the sheet of backing material 10 is substantially impervious to moisture, and the coating 12 of combustible material is provided on one surface only thereof, the preferred configuration of the igniter roll 14 of Fig. 2, with the backing material constituting its exterior, permits the igniter roll to be handled and stored for a convenient length of time without fear of too rapid deterioration of the combustible material.

Figure 3 illustrates a preferred construction of an igniter 16 employing an igniter roll 14 of bonded combustible materials of the type above described. Any suitable means for generating heat for igniting the combustible materials of the igniter roll may be provided; preferably, however, such means are disposed in such a manner as to initially ignite the combustible materials at the center of the igniter roll 14. For example, a pair of squibs 18, 20 inserted centrally within the ends of the igniter roll 14, and adapted to be flashed electrically through respective pairs of connecting wires 22 and 24, may be employed to ignite the combustible materials. When the squibs 18, 20 are flashed, heat generated thereby travels through the center of the igniter roll between the squibs to ignite the combustible materials; immediately upon such materials being ignited, progressive and extremely rapid burning of the combustible material of the igniter roll occurs. Furthermore, the presence of the sheet of backing material does not adversely affect the burning rate of the combustible materials. Also, by virtue of the roll configuration of the sheet of backing material 10 and the coating 12 of combustible materials thereon, rapid and progressive combustion of such materials is insured.

A pair of disk-shaped retaining members 30, 32 are affixed to the ends of the igniter roll 14; as will be explained more clearly hereafter in connection with Figs. 4 and 5, these disk-shaped retaining members provide means for holding the fuel igniter 16 in position in an opening provided therefor in a propellant.

The disk-shaped retaining members 30, 32 may be affixed to the igniter roll 14 in any suitable manner, as, for example, by means of a suitable tape 34. The connecting wires 22 for the squibs 18 preferably extends from the squib 18 along the surface of the igniter roll 14 toward the opposite end thereof to pass through a central aperture in the disk-shaped member 32 along with the pair of connecting wires 24 of the electric squib 20. In this manner, access to both pairs of connecting wires 22, 24 from one position is provided.

The fuel igniter construction 16 is made substantially water-tight by suitably sealing those portions thereof which otherwise permit moisture to reach the combustible material of the igniter roll 14. For example, at the points along the surface of the igniter roll 14 through which the connecting wires 22 emerge and enter the tape 34 which affixes the disk-shaped members 30, 32, to the ends of the igniter roll, where the respective pairs of connecting wires 22, 24 emerge from the central aperture of the disk-shaped member 32, sealing materials such as polysulfide synthetic rubber may be applied to provide an effective seal 35 and prevent moisture from attacking the combustible materials of the igniter roll.

Figure 4:
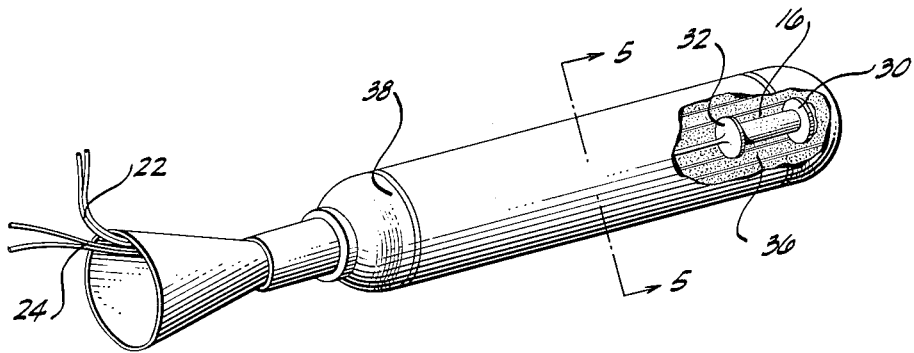
Fig. 4 is a perspective view of a rocket motor utilizing the igniter construction shown in Fig. 3.

Referring to Figs. 4 and 5, which illustrate a specific use for the fuel igniter 16, the fuel igniter is shown inserted within a propellant 36 contained in a rocket motor housing 38. An opening 40 provided in the propellant 30 may be of any suitable configuration to receive the fuel igniter 16; for example, as shown in Fig. 5, such opening 40 may be star-shaped. Preferably, the disk-shaped retaining members 30 and 32 are made of a suitable resilient material, such as rubber, of sufficient diameter to be received in the opening 40 of the propellant 36 and to releasably engage the propellant for retaining the igniter 16 in a desired position within the propellant.

Because the ignition of the propellant is readily achieved by the igniter construction taught herein, ejection of parts of the igniter 16 by gas pressures developed therein cannot occur before the desired ignition of the propellant is achieved.

As employed in a rocket motor in the manner described in connection with Figs. 4 and 5, a fuel igniter 16 is effective to insure combustion of the propellant 36 substantially instantaneously upon the combustible materials of such fuel igniter being ignited. Therefore, by virtue of the fuel igniter construction as taught herein, reliable combustion of the propellant is assured, and the necessity for employing a nozzle closure element for the rocket motor is eliminated.

From the foregoing explanation, it is clear that there has been described an improved igniter construction in which ignitable materials are arranged to generate a maximum amount of heat almost instantaneously, whereby combustion of a fuel may be reliably effected through the use of such igniter without resort to the use of elements for confining the igniter within the fuel.

What is claimed as new is:

1. An igniter adapted for insertion within an opening of a solid fuel, said igniter comprising, in combination, a sheet of moisture-resistant foundation material; said sheet having a coating of bonded combustible materials on one surface thereof; said sheet as coated being formed in a tight roll; heat generating means in contact with said roll at least one end thereof for initiating combustion of said combustible materials; and means, disposed at least at one end of said roll, for engaging an interior portion of said solid fuel and temporarily retaining said roll within the opening of said solid fuel.

2. An igniter as defined in claim 1, in which said heat generating means comprises at least one electrically operable squib inserted centrally in one end of said igniter element, and the fuel engaging means comprises a resilient member affixed to said igniter element at one end thereof.

3. An igniter as defined in claim 1, in which said sheet of backing material is cellulose acetate.

4. In an igniter for a fuel, an igniter element comprising in combination, a sheet of flexible, moisture-resistant backing material, said material having a coating of bonded combustible materials on one surface thereof, the coated sheet of backing material being formed in a tight roll to provide a compact arrangement of the combustible materials, and means disposed within at least one end of said roll for igniting said combustible materials, the compactly arranged combustible materials being effective, upon being ignited, to generate intense heat substantially instantaneously.

5. An igniter element as defined in claim 4, in which said sheet of backing material is cellulose acetate, and said coating of combustible materials comprises a mixture of magnesium and potassium perchlorate.

6. An igniter for igniting a rocket motor solid propellant having a central opening and, comprising a roll of ignitable material disposed on and bonded to one surface of a sheet of cellulose acetate, squibs centrally positioned within the ends of said roll, means for effecting burning of said equibs at a desired instant to ignite said material, and resilient means affixed to said roll for releasable engagement within the opening of said propellant.

7. An igniter adapted for insertion within an opening of a solid fuel, said igniter comprising, in combination, a sheet of backing material coated on one surface with bonded combustible materials, said sheet of backing material being shaped to form a roll providing an igniter element, heat generating means in contact with said igniter element at least at one end thereof for initiating combustion of said combustible materials, and means disposed at least at one end of said igniter roll for engaging an interior portion of said solid fuel and temporarily retaining said igniter element within the opening of said solid fuel.

References Cited in the file of this patent

UNITED STATES PATENTS

| | | |
|---|---|---|
| 838,748 | Du Pont | Dec. 18, 1906 |
| 930,526 | Bloss | Aug. 10, 1909 |
| 1,113,478 | Phillips | Oct. 13, 1914 |
| 2,548,972 | Grisamore et al. | Apr. 17, 1951 |
| 2,613,497 | MacDonald | Oct. 14, 1952 |